United States Patent [19]

Greenaway

[11] 4,362,692
[45] Dec. 7, 1982

[54] REACTOR COMPONENT AUTOMATIC GRAPPLE

[75] Inventor: Paul R. Greenaway, Bethel Park, Pa.

[73] Assignee: The United States of America as represented by the United States Department of Energy, Washington, D.C.

[21] Appl. No.: 203,307

[22] Filed: Nov. 3, 1980

[51] Int. Cl.³ .............................................. G21C 19/00
[52] U.S. Cl. .................................... 376/268; 376/271; 294/86 A
[58] Field of Search ............. 376/268, 271; 294/86 R, 294/86 A

[56] References Cited

U.S. PATENT DOCUMENTS

| | | | |
|---|---|---|---|
| 3,950,020 | 4/1976 | Hoffmeister | 294/86 A |
| 4,202,727 | 5/1980 | Batjukov | 294/86 A |
| 4,236,967 | 12/1980 | Batjukov | 376/271 |
| 4,244,616 | 1/1981 | Buchale | 294/86 A |
| 4,253,695 | 3/1981 | Blaive | 294/86 A |
| 4,279,699 | 7/1981 | Kuhn | 294/86 A |

Primary Examiner—Donald P. Walsh
Attorney, Agent, or Firm—K. R. Bowers

[57] ABSTRACT

A grapple for handling nuclear reactor components in a medium such as liquid sodium which, upon proper seating and alignment of the grapple with the component as sensed by a mechanical logic integral to the grapple, automatically seizes the component. The mechanical logic system also precludes seizure in the absence of proper seating and alignment.

6 Claims, 5 Drawing Figures

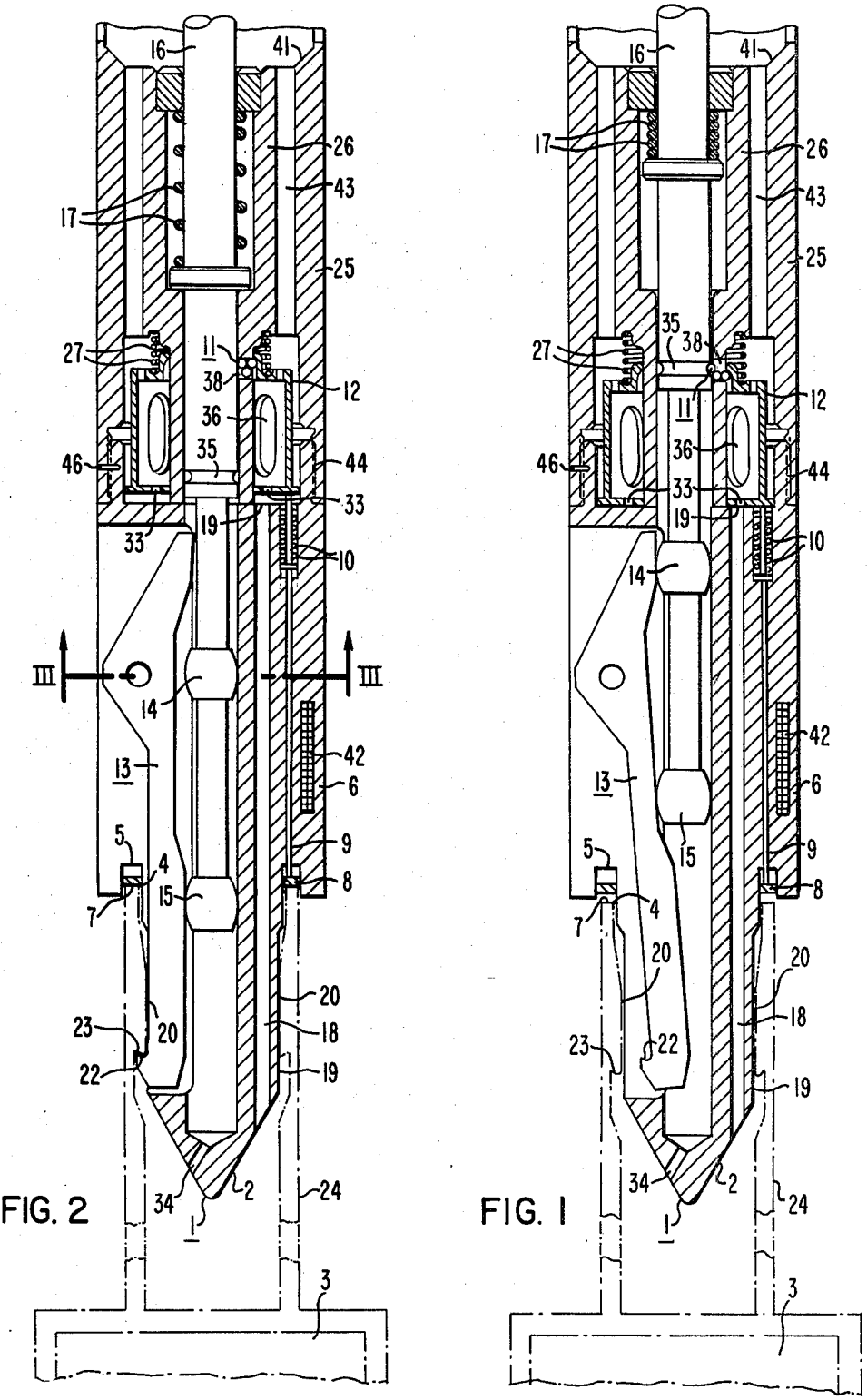

REACTOR COMPONENT AUTOMATIC GRAPPLE

GOVERNMENT CONTRACT

This invention was made or conceived during performance of a contract with the U.S. Government, designated Union Carbide Prime Contract W-7405-ENG-26 and Westinghouse-Carbide P.O. 25X-54062-V.

BACKGROUND OF THE INVENTION

This invention relates generally to grapples and hoists and more particularly to grapples used to seize, lift, transport, lower, and install the various internal components of nuclear reactors, especially nuclear fuel assemblies.

The component to be moved is usually located in a hostile environment such as hot water or liquid sodium and may be radioactive or located in a radiation field. The operator is usually some distance from the site of the task, and often cannot see the component and grapple. Despite this and other handicaps, the grappling task requires accuracy and care due to close tolerances and safety considerations. An expeditious, speedy performance of the grappling task can reduce plant downtime and personnel radiation exposure.

The grapples presently in use employ a variety of electrical and mechanical devices to monitor the grapple location and status, and control grapple operation. Verification of proper seating of the grapple is often accomplished visually, followed by operator-initiated grapple seizure. When visibility is hampered or impossible, the operator may rely on time-consuming trial-and-error operation.

Accordingly, it is desired to provide a grapple which is safe and reliable and which operates automatically without the operator's visual verification of proper seating.

SUMMARY OF THE INVENTION

The invention is a component grapple designed for automatic, remote, visually unmonitored operation in a hostile fluid environment. In preferred form, the grapple seizes the component with a set of fingers, these being spread outward by movement of a spring-impelled actuating stem. The movement of the actuating stem is prevented by a ball-detent latch unless the grapple is properly seated on the component as sensed by a mechanical trigger. When properly seated, the trigger releases the ball-detent latch which frees the actuating stem to cause the fingers to automatically seize the component.

The nose of the grapple is shaped to properly align the grapple with the component during lowering of the grapple. The trigger is recessed into the grapple such that the automatic seizure of the grapple cannot occur until the grapple is fully and properly seated on the component.

The combination of the recessed trigger, the alignment nose feature, and the ball-detent latch together comprises a grapple which operates automatically to seize the component when the grapple is properly aligned and seated.

BRIEF DESCRIPTION OF THE DRAWINGS

The advantages and features of the invention will be best understood by reference to the following description, taken in connection with the accompanying drawings, in which:

FIG. 1 is a partially-sectioned elevation view of the grapple shown in the condition just prior to seizing;

FIG. 2 is a partially-sectioned elevation view of the grapple shown in the seized condition;

DETAILED DESCRIPTION OF THE INVENTION

Figure 3:
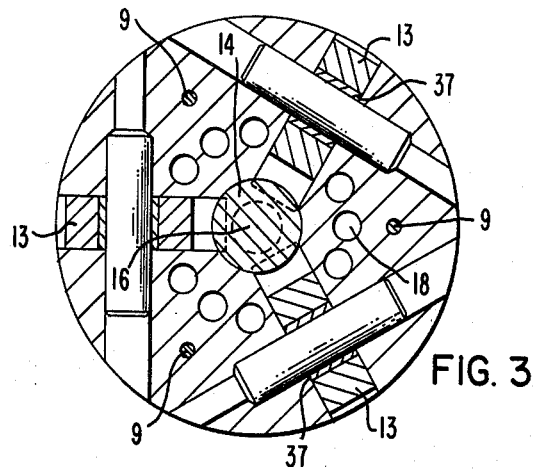
FIG. 3 is a sectional view taken at III—III of FIG. 2.

The mechanical details of the invention will be described with reference to FIG. 1.

The general task to be performed is the seizure, transport, and installation of a component 3 which may initially be located in a reactor, spent fuel pit, cask, or elsewhere. All components 3 with which the invented grapple is intended to be used must have a lifting socket 24 or equivalent such that the below-described alignment and seating of grapple and component 3 is feasible.

Since the component 3 may be immersed in liquid sodium, it is desirable to prevent solidification of this material in the grapple when the grapple is withdrawn from the sodium pool. Accordingly, drain holes 18 and nose drain hole 34 are provided to permit liquid to drain out of the grapple during withdrawal from the pool. Preferably, there are 9 drain holes 18.

A flow path is provided to allow passage through the grapple of any liquid flow needed to cool the component 3. This path begins with drain holes 18, extends through cylinder bottom holes 33 and cylinder side holes 36, and passes through rising stem subassembly holes 43 to the top of the grapple.

For some purposes, such as preventing thermal shock on entry to the liquid pool, heating coils 42, an example of which is shown in FIG. 1 may be added.

All external surfaces shown for convenience to be flat in the drawings, may be made concave or otherwise shaped to expedite the draining of liquid material. As an illustration of this principle, surface 41 is so shown in FIG. 1.

The grapple is constructed of materials which will endure the hostile environment in which it will be used. For use in liquid sodium, the grapple bushings 37, (FIG. 3), seizing cam 15 and releasing cam 14 may preferably be Stellite 3 while the remainder of the grapple is Type 440C or 300 Series stainless steel, or Inconel 718.

The grapple utilizes a common, well-known feature to achieve proper alignment with the component 3. The grapple nose 1 has a shaped nose surface 2 which, during the lowering of the grapple onto the lifting socket 24, first contacts the lifting socket 24 at socket edge 4, thereby guiding the grapple during further downward travel. When downward travel of the grapple has progressed to the point that nose surface 19 of the grapple encounters socket surface 20 of the lifting socket 24, the above-described guiding interaction of nose surface 2 and socket edge 4 has corrected any small alignment error such that the grapple is properly aligned with component 3. This feature achieves proper alignment without visual supervision when the uncertainty of the positioning of a crane or other device used to support the grapple is exceeded by the lifting socket 24 radius.

The grapple seizes and releases the component 3 by the spreading-to-seize or relaxing-to-release of a plurality of gripping fingers 13. There are preferentially three of these gripping fingers 13 radially arranged and equally spaced at 120° intervals, as shown in FIG. 3. The spreading of the gripping fingers 13 is effected by the downward travel of seizing cam 15 on actuating stem 16 as impelled by the force of actuating spring 17. The relaxing of the gripping fingers 13 is effected by the upward travel of releasing cam 14 on actuating stem 16 as impelled by an external upward force on the actuating stem 16. The source of this force may be a motor driven linear actuator, a manual system, or other arrangement.

The gripping fingers 13 have a tapered surface 22 which is adapted to mate with lift surface 23 of the lifting socket 24 when the grapple is in the seized position as in FIG. 2. When the component 3 is supported from below or otherwise than by the grapple, the grapple's weight causes the grapple to settle slightly lower in the lifting socket 24, thereby disestablishing contact between tapered surface 22 and lift surface 23, as shown in FIG. 2. The swinging arc of gripping fingers 13 during the release operation enables the gripping fingers 13 to release lifting socket 24.

When the component is supported by the grapple, surface 22 bears directly on surface 23 and precludes release of component 3 while component 3 is otherwise unsupported by blocking the swinging arc motion of fingers 13. Furthermore, seizing cam 15 also blocks the same fingers 13 motion.

An important feasture of this invention is a mechanical ball-detent latch which amounts to seize-locking means by the action of which the grapple is prevented from seizing the component 3 when the latch is locked and whereby the grapple automatically seizes the component 3 when the latch is unlocked. The ball-detent latch consists of a plurality of ball sets 11, preferably three in number, a detent cylinder 12, a detent spring 27, and a latch mechanism cylinder 26. The latch mechanism cylinder 26 contains a ball chamber 38 which contains the ball set 11, preventing movement of the balls around a stem groove 35. The movement of the balls is also restrained by the detent cylinder 12. The vertical position of the detent cylinder 12, as controlled by a machanical trigger system described below, causes the balls to roll in and out of the configurations depicted in FIGS. 4 and 5. This action locks or unlocks the latch by respectively preventing or allowing downward travel of actuating stem 16. The actuating stem 16 is free to travel downward in FIG. 4 (latch unlocked). The actuating stem 16 is prevented from downward motion in FIG. 5 by the presence of ball 21 in stem groove 35 (latch locked).

The ball-detent system causes a small vertical force, originating in the medium detent spring 27, to control the release of a larger vertical force (about 15 lbs.) originating in a large actuating spring 17. In the preferred embodiment, the ball set 11 consists of three spherical balls of equal diameter. As alternatives, the ball set 11 could utilize more or fewer balls, or balls of unequal diameters, these alternatives leading however to more complicated fabrication and maintenance of the grapple. The ball-detent latch could also be adapted to use roller bearings by altering the actuating stem 16 to have a polygonal cross-section and roller-bearing-accepting grooves. This configuration may be preferred in applications where the grapple is heated since the increased linear contact of a roller with the actuating stem 16 over ball type point contact would enhance the transfer of heat to the roller and the detent cylinder 12.

Figure 5:
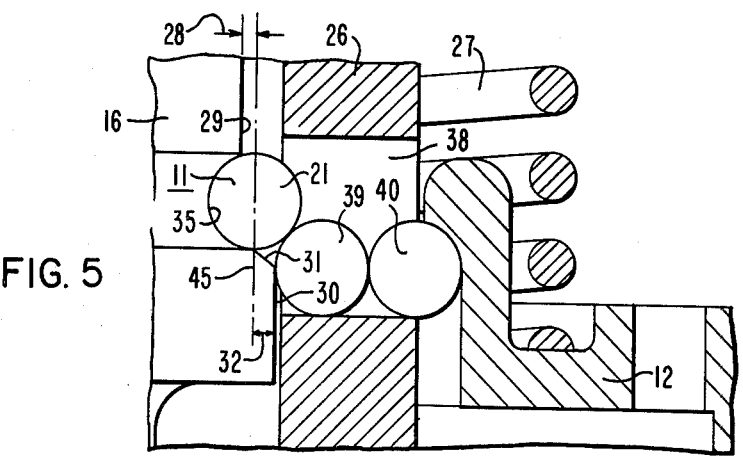
FIG. 5 is a section of the ball-detent latch in the locked configuration.

Prior to seizing, one ball 21, as shown in FIG. 5, of each ball set 11 is held in the stem groove 35 by the action of the forces in the load path created by each ball set 11. The vertical force produced by the actuating spring 17 is transmitted radially outward by the balls in ball set 11 and resisted by the detent cylinder 12 which cannot move radially due to contact with the grapple subassembly 6. Ball 21 prevents downward (and upward) travel of actuating stem 16. The detent cylinder 12 is held securely in place by the detent spring 27 and the latch mechanism cylinder 26.

Figure 4:
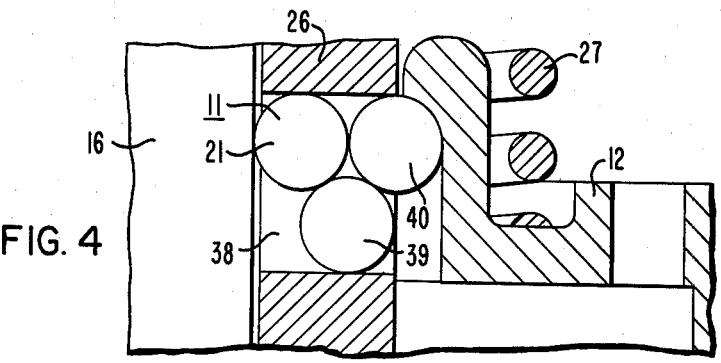
FIG. 4 is a section of the ball-detent latch in the unlocked configuration.

The operation of the ball sets 11 is considered to be best when these ball sets 11 and the stem groove 35 have the design indicated in FIGS. 4 and 5. The ball 21 is shown in FIG. 5 to be in the locking position, showing the preferred embodiment in which there is an upper offset 28 between the upper stem surface 29 of the actuating stem 16 and the extension of the ball 21 centerline 45 and in which lower stem surface 30 of the actuating stem 16 extends beyond the ball 21 centerline 45 with a lower offset 32. Additionally, the stem groove 35 has a stem tapered surface 31.

Another important feature of this invention is a mechanical trigger system which amounts to a mechanical logic whereby the ball-detent latch is locked or unlocked depending on whether the grapple is properly aligned with and seated on the lifting socket 24. The mechanical logic, in the preferred embodiment, consists of a plurality of trigger fingers 9, return springs 10, and a trigger ring 8 which is in a recess 5 in the grapple subassembly 6. The trigger fingers 9 and return springs 10, preferably three in number, are located in holes in the grapple subassembly 6. The trigger fingers 9 bear on the detent cylinder 12 and can lift or lower the detent cylinder 12 as a force is applied on these trigger fingers 9 by the trigger ring 8. The trigger ring 8 transmits this force if the end surface 7 of the lifting socket 24 bears on the trigger ring 8, which can only occur if the grapple is properly aligned with and seated on the lifting socket 24.

The mechanical nature of the ball-detent latch and the trigger system is considered to have superior reliability over equivalent electrical systems in a hostile environment.

The seizing operation of the grapple will now be described. As indicative above, the grapple is self-aligning during the lowering process. During the lowering process, end surface 7 of the lifting socket 24 will encounter trigger ring 8. Trigger ring 8 is located in recess 5 so that inadvertent action of the trigger system is precluded. Prior to contact between end surface 7 of lifting socket 24 and trigger ring 8, tapered surface 22 of gripping fingers 13 passes below lift surface 23 of the lifting socket 24. Further lowering of the grapple causes end surface 7 to begin to force trigger ring 8 upward. This movement compresses return springs 10 and lifts the detent cylinder 12, compressing detent spring 27, and allows the balls 21 in ball sets 11 to roll out of the stem groove 35 from the ball configuration appearing in FIGS. 1 and 5 to the ball configuration in FIGS. 2 and 4. The actuating stem 16 is thereby freed to move downward, by actuating spring 17 tension, and the seizing cam 15 action on gripping fingers 13 spreads the gripping fingers 13 to seize lifting socket 24. Hoisting, transport, and lowering of the component 3, by externally applied force on the rising stem subassembly 25, can now be effected as desired.

The releasing operation will now be described. When the weight of component 3 is externally removed from surface 22 of the gripping fingers 13, an upward external force is applied to the actuator stem 16. The actuator stem 16 moves upward which causes releasing cam 14 to retract gripping fingers 13, releasing lifting socket 24. The upward movement of actuator stem 16 also recompresses the actuator spring 17. The grapple can now be removed by the rising stem assembly 25. As soon as the grapple lifts off the lifting socket 24, the trigger return spring 10 drives the trigger fingers 9 and trigger ring 8 down, recocking the trigger. Simultaneously, the detent spring 27 forces the detent cylinder 12 downward, causing the balls in ball set 11 to roll from the configuration of balls in FIG. 4 to that in FIG. 5. Balls 21 roll into the stem groove 35, relatching the ball-detent latch. The grapple is now ready for a new seizing operation.

The grapple outside diameter may be greater than the diameter of the lifting socket 24. That design permits the trigger ring 8 to be wholly enclosed within the grapple subassembly 6 and thereby protects against inadvertent seizing of the grapple by an accidental bump.

The grapple subassembly 6 in FIG. 1 is removable from the rising stem subassembly 25 at connection 44 to permit replacement. Connection 44 may be a male-female threading connection, or other design, and may have a lock-pin 46 to prevent inadvertent detachment.

The above-described grapple design accomplishes the aforementioned needs for a safe, reliable, automatic grapple since: (1) the nose design provides for proper seating and alignment; (2) the mechanical logic, on proper alignment and seating, automatically initiates seizure; and (3) the recessed trigger prevents inadvertent seizure. This combination of design features allows operation of the grapple in conditions of low visibility, with a minimum of wasted time. The entirely automatic seizing operation of the invention suggests that, with this grapple, an entire refueling operation could be computerized. This possibility arises as a consequence of the ability of this grapple to operate without benefit of visual supervision.

The operating principles of the grapple have been successfully demonstrated by the construction and testing of a plexiglass model.

This grapple is considered a remarkable improvement to existing art and should achieve widespread industrial application.

While in the foregoing there have been described several preferred embodiments and uses of the invention, it should be understood that various changes and modifications can be made without departing from the true spirit and scope of the invention, and that the foregoing should be interpreted as illustrative rather than limiting.

I claim:

1. A grapple for releasably seizing a reactor component, said grapple comprising:
   (a) means for seizing said component;
   (b) an impelled actuating stem for actuation of said seizing means having a circumferential stem groove;
   (c) means for releasably locking said actuating stem by mechanical intercourse with said stem groove, said stem locking means having a plurality of detent-ball sets, each of said detent-ball sets having three balls adapted to cause one of said balls to roll into said stem groove thereby locking said actuating stem;
   (d) a mechanical trigger adapted to sense proper alignment with and seating on said component by said grapple and thereupon unlocking said locking means by withdrawal of said locking means from said stem groove, thereby initiating impelled action of said actuating stem thereby automatically triggering the seizing action of said seizing means, and further adapted to serve in cooperation with said locking means as a mechanical logic which disallows grapple seizure in the absence of proper grapple alignment with and seating on said component;
   (e) a grapple subassembly surrounding a lower portion of said actuating stem and surrounding and adapted to support said seizing means, said stem locking means, and said trigger, having at one end means for alignment and having at another end means for grapple subassembly attachment; and
   (f) a rising stem subassembly surrounding an upper portion of said actuating stem having at one end means for rising stem subassembly attachment adapted to mate with and releasably attach to said grapple subassembly attachment means.

2. The grapple of claim 1 further comprising drain holes therethrough adapted to permit passage of coolant through said grapple.

3. The grapple of claim 1 or 2 further comprising means for electrical heating adapted to heat said grapple.

4. The grapple of claim 1 wherein the stem groove and the actuating stem establish an upper and lower offset with respect to the centerline of a ball of said detent-ball set which is seated in said stem groove and wherein said actuating stem has a stem-tapered surface.

5. The grapple of claim 1 wherein said grapple subassembly attachment means and said rising stem subassembly attachment means are male-female threads.

6. The grapple of claim 1 wherein the said grapple subassembly attachment means has a lock-pin.

* * * * *